(12) United States Patent
Teramoto et al.

(10) Patent No.: US 12,152,153 B2
(45) Date of Patent: Nov. 26, 2024

(54) LIGHT TRANSMITTING MEMBER, TRANSPARENT PROTECTIVE COVER, AND IMAGE PICKUP SYSTEM

(71) Applicant: CANON KABUSHIKI KAISHA, Tokyo (JP)

(72) Inventors: Yoji Teramoto, Kanagawa (JP); Shun Ouchi, Kanagawa (JP); Yu Kameno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 18/057,312

(22) Filed: Nov. 21, 2022

(65) Prior Publication Data

US 2023/0174789 A1 Jun. 8, 2023

(30) Foreign Application Priority Data

Dec. 3, 2021 (JP) .............................. 2021-197361
Oct. 13, 2022 (JP) .............................. 2022-164910

(51) Int. Cl.
*H04N 23/51* (2023.01)
*C09D 1/00* (2006.01)
*C09D 5/00* (2006.01)
*C09D 7/40* (2018.01)
*C09D 7/62* (2018.01)
*G02B 27/00* (2006.01)
*H04N 23/52* (2023.01)

(52) U.S. Cl.
CPC ................. *C09D 1/00* (2013.01); *C09D 5/00* (2013.01); *C09D 7/62* (2018.01); *C09D 7/67* (2018.01); *C09D 7/70* (2018.01); *G02B 27/0006* (2013.01); *H04N 23/51* (2023.01); *H04N 23/52* (2023.01)

(58) Field of Classification Search
CPC ........ H04N 23/50; H04N 23/51; H04N 23/52; H04N 23/55
USPC .......................................................... 348/373
See application file for complete search history.

(56) References Cited

U.S. PATENT DOCUMENTS

| 6,327,430 | B1 | 12/2001 | Ikemori et al. |
| 9,712,729 | B2 | 7/2017 | Yoshino et al. |
| 2013/0136436 | A1 | 5/2013 | Yoshino et al. |
| 2017/0073524 | A1* | 3/2017 | Nakayama ............... C09D 1/00 |
| 2019/0056529 | A1* | 2/2019 | Zhu .................. B29D 11/00865 |
| 2019/0187335 | A1* | 6/2019 | Nakayama ............. C23C 14/18 |
| 2023/0057817 | A1* | 2/2023 | Takahashi ............... B32B 17/06 |
| 2023/0110637 | A1* | 4/2023 | Kusaka ................... G02B 1/111 |
| | | | 428/220 |

(Continued)

FOREIGN PATENT DOCUMENTS

| JP | 2000-47311 A | 2/2000 |
| JP | 2001-233611 A | 8/2001 |
| JP | 2005-283611 A | 10/2005 |

(Continued)

OTHER PUBLICATIONS

Asami et al., U.S. Appl. No. 18/057,310 filed Nov. 21, 2022.

*Primary Examiner* — Anthony J Daniels
(74) *Attorney, Agent, or Firm* — Venable LLP (57) ABSTRACT

Provided is a light transmitting member including: a base material; a first porous layer formed on a first surface of a base material; and a second porous layer formed on a second surface opposed to the first surface of the base material, wherein the second porous layer has a pore volume larger than a pore volume of the first porous layer.

32 Claims, 4 Drawing Sheets

(56) References Cited

U.S. PATENT DOCUMENTS

2023/0174421 A1\* 6/2023 Ma .................... B32B 17/10036
                                                              428/432

FOREIGN PATENT DOCUMENTS

| JP | 2008-139581 A | 6/2008 | | |
|---|---|---|---|---|
| JP | 2014-92654 A | 5/2014 | | |
| WO | WO-2014057680 A1 \* | 4/2014 | ............. | B32B 27/08 |
| WO | WO-2020145373 A1 \* | 7/2020 | ............. | B32B 7/023 |
| WO | WO-2020158030 A1 \* | 8/2020 | ............ | B01J 21/063 |

\* cited by examiner

LIGHT TRANSMITTING MEMBER, TRANSPARENT PROTECTIVE COVER, AND IMAGE PICKUP SYSTEM

BACKGROUND

Technical Field

The present disclosure relates to a light transmitting member excellent in antifogging property, antifouling property, and optical performance, a transparent protective cover, and an image pickup system, and to a method of producing a light transmitting member.

Description of the Related Art

Light transmitting members having various functional films on surfaces are used in an optical lens, a cover for image pickup equipment, such as a camera or a video, a window glass of an automobile or a train, and the like.

In Japanese Patent Application Laid-Open No. 2014-92654, a hydrophilic film is formed on an outer surface of a dome-shaped transparent camera cover, to thereby prevent water droplets and improve an antifouling property.

In Japanese Patent Application Laid-Open No. 2000-47311, an antifogging film is formed on an inner side of a window member for sealing of an underwater camera, to thereby prevent fogging.

In Japanese Patent Application Laid-Open No. 2005-283611, a low-refractive-index layer is formed on a light transmitting base material film, and the low-refractive-index layer is formed of a film containing hollow silica fine particles or porous silica fine particles, to thereby achieve low reflection.

As described above, there is a demand for improving functions, such as hydrophilicity, an antifouling property, an antifogging property, and a low reflectance, of the light transmitting member using a glass base material or a resin base material.

SUMMARY

Depending on the usage environment, the light transmitting member may be decreased in light transmitting property due to disturbances, such as the adhesion of water droplets and bubbles, and mud dirt and oil stains. When an object is visually recognized or imaged through the light transmitting member decreased in light transmitting property, poor visibility and deterioration of an acquired image occur. In addition, in the case of image pickup equipment in which an optical system is accommodated in a housing or equipment used in a state of being accommodated in a closed space, such as a housing or a case, as in an underwater camera or a monitoring camera, the environment varies between the outer surface and the inside of the closed space, and hence the disturbance situation also varies.

The present disclosure has been made in view of the above-mentioned background art, and provides a light transmitting member in which a decrease in light transmitting property depending on the usage environment is suppressed, and a method of producing the light transmitting member.

A light transmitting member according to the present disclosure includes: a base material; a first porous layer formed on a first surface of the base material; and a second porous layer formed on a second surface opposed to the first surface of the base material, wherein the second porous layer has a pore volume larger than a pore volume of the first porous layer.

Further features of the present disclosure will become apparent from the following description of exemplary embodiments with reference to the attached drawings.

DESCRIPTION OF THE EMBODIMENTS

An embodiment of the present disclosure is described below with reference to the drawings. In the following description and the drawings, a component common to a plurality of drawings is denoted by a common symbol. Further, the common component may be described with cross-reference to the plurality of drawings without notice. In addition, the description of the component denoted by the common symbol may be omitted.

[Light Transmitting Member]
(With Regard to Shape of Light Transmitting Member)

Figure 1A:
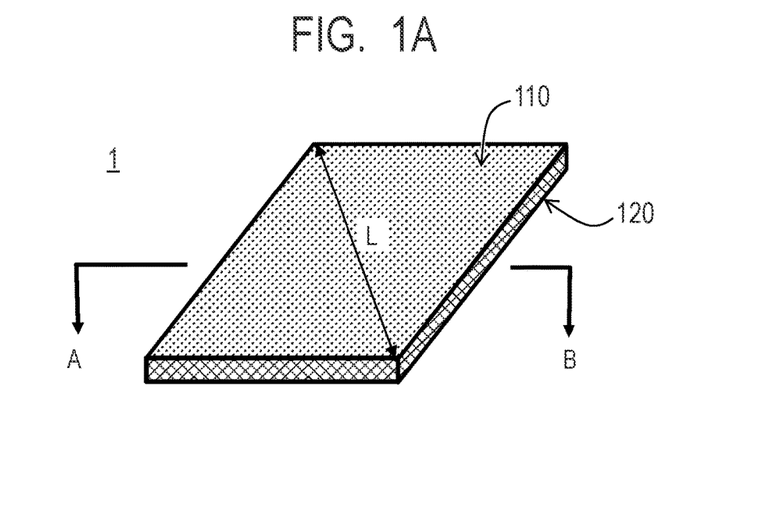
FIG. 1A and FIG. 1B are each a schematic view for illustrating an example of a light transmitting member.

FIG. 1A is a perspective view of an example of a light transmitting member 1 according to an embodiment of the present disclosure. The light transmitting member 1 has a shape in accordance with the application thereof, such as a film shape, a sheet shape, a plate shape, a dome shape, or a spherical shape. When the light transmitting member 1 has a film shape, the light transmitting member 1 may be referred to as "film". When the light transmitting member 1 has a sheet shape, the light transmitting member 1 may be referred to as "sheet". When the light transmitting member 1 has a plate shape, the light transmitting member 1 may be referred to as "plate". The light transmitting member 1 has a front surface 110 that is brought into contact with an outside at the time of use and a back surface 120 that is brought into contact with a closed space at the time of use. The front surface 110 and the back surface 120 have substantially the same shape. The distance between the front surface 110 and the back surface 120, that is, a thickness T of the light transmitting member 1 is smaller than a maximum width L of the front surface 110 and the back surface 120, and for example, the thickness T of the light transmitting member 1 may be less than $1/100$ of the maximum width L. The front surface 110 and the back surface 120 of the light transmitting member 1 in this example are each a quadrilateral, but are not limited thereto.

In addition, when the light transmitting member 1 has a dome shape, the shape is close to a hemispherical shape. The detailed shape thereof depends on the use application, but it is required that the thickness of a base material be set so that the dome shape can be held.

With Regard to Thickness of Light Transmitting Member 1

Figure 1B:
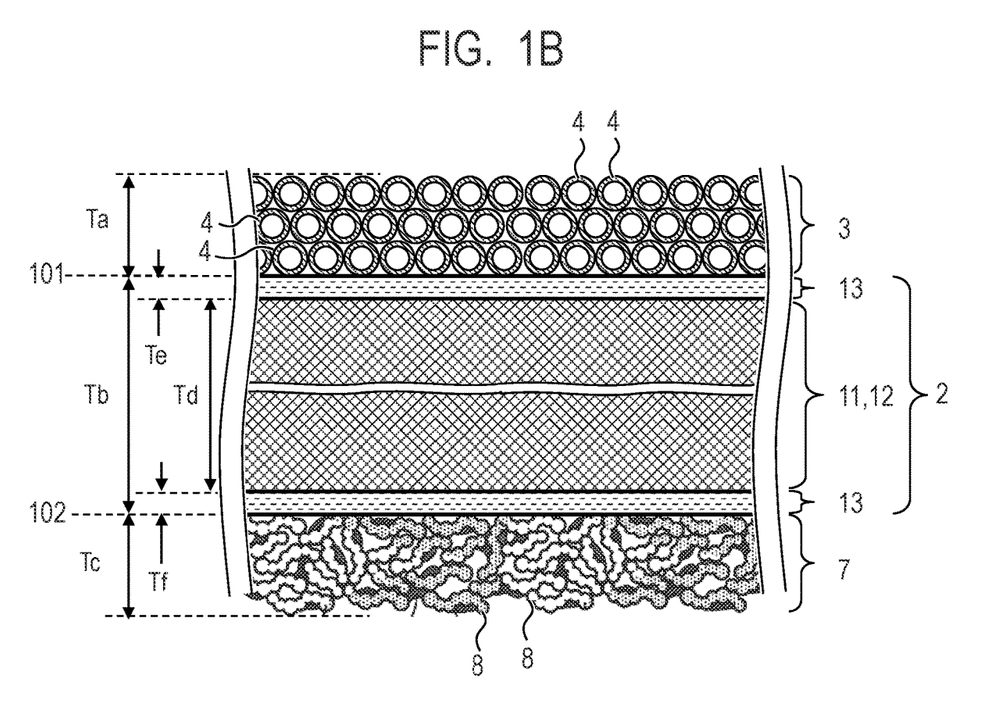

FIG. 1B is a sectional view of the light transmitting member 1 taken along the line A-B illustrated in FIG. 1A.

The light transmitting member 1 includes a base material 2, a first porous layer 3 arranged on one (first) surface of the base material 2, and a second porous layer 7 arranged on another (second) surface of the base material 2. The base material 2 is formed of a glass base material 11 or a resin base material 12, and may further include an intermediate layer 13 between the glass base material 11 or the resin base material 12 and the first porous layer 3 or the second porous layer 7. The first porous layer 3 contains hollow particles 4, and the second porous layer 7 contains solid particles 8.

The base material 2 has two principal surfaces 101 and 102 opposed to each other. The distance between the principal surface 101 and the principal surface 102 is a thickness Tb of the base material 2. The base material 2 is formed of the glass base material 11 or the resin base material 12, and may further include the intermediate layer 13 between the glass base material 11 or the resin base material 12 and the first porous layer 3 or the second porous layer 7. Thus, the thickness Tb of the base material 2 is defined as a sum of a thickness Td of the glass base material 11 or the resin base material 12 and thicknesses Te and Tf of the intermediate layers. The thickness Tb of the base material 2 may be 1 μm or more and less than 100 mm. When the thickness Tb of the base material 2 is less than 250 and the light transmitting member 1 has flexibility, it can be said that the light transmitting member 1 has a film shape. When the thickness Tb of the base material 2 is 250 μm or more, and the light transmitting member 1 has flexibility, it can be said that the light transmitting member 1 has a sheet shape. When the light transmitting member 1 does not have flexibility, it can be said that the light transmitting member 1 has a plate shape.

The first porous layer 3 is formed on the principal surface 101 (one surface) of the base material 2, and the second porous layer 7 is formed on the principal surface 102 (another surface) of the base material 2.

The light transmitting member 1 is suitable as a window in a closed space, such as a housing or a case that accommodates an article. The closed space as used herein is not required to be completely shut off from the outside, and some air may come in and out. In addition, as required, the light transmitting member 1 may include an opening for communication to the outside.

When the light transmitting member 1 is used as a window in a closed space, it is appropriate that the light transmitting member 1 be installed in a housing or a container that accommodates an article so that the first porous layer 3 is positioned on a surface (one surface) on a side exposed to the external environment and the second porous layer 7 is positioned on a surface (another surface) on a closed space side. As described in detail below, in the light transmitting member 1 according to the present disclosure, the first porous layer 3 has a porous structure excellent in antifouling property, and the second porous layer 7 has a porous structure excellent in hygroscopicity. Because of this, when the light transmitting member 1 is installed in the above-mentioned direction, dirt caused by the external environment can be suppressed, and fogging on the closed space side caused by a change in humidity can be suppressed, with the result that a state with a high light transmitting property can be maintained.

(Relationship in Thickness Between First Porous Layer 3 and Second Porous Layer 7)

The first porous layer 3 on the principal surface 101 has a physical thickness Ta, and the second porous layer 7 on the principal surface 102 has a physical thickness Tc. The physical thicknesses Ta and Tc of the first porous layer 3 and the second porous layer 7 are each smaller than the thickness Tb of the base material 2 (Ta, Tc<Tb). Accordingly, the shape and mechanical characteristics of the light transmitting member 1 are mainly determined by the base material 2. The physical thickness Ta of the first porous layer 3 and the physical thickness Tc of the second porous layer 7 may each be less than 200 nm. An optical thickness nd of each the first porous layer 3 and the second porous layer 7 described later is defined by a product of the refractive index of each of the first porous layer 3 and the second porous layer 7 and the physical thickness of each of the first porous layer 3 and the second porous layer 7. The physical thickness Tc may be the same as or different from the physical thickness Ta.

(With Regard to First Porous Layer 3)

The first porous layer 3 has a physical thickness of preferably 80 nm or more and 200 nm or less, more preferably 100 nm or more and 160 nm or less. There is a tendency that when the thickness is less than 80 nm, abrasion resistance is difficult to obtain, and when the thickness is more than 200 nm, an antireflection effect is difficult to obtain.

A refractive index $n_1$ of the first porous layer 3 is preferably 1.20 or more and 1.30 or less, more preferably 1.22 or more and 1.30 or less.

Figure 2A:
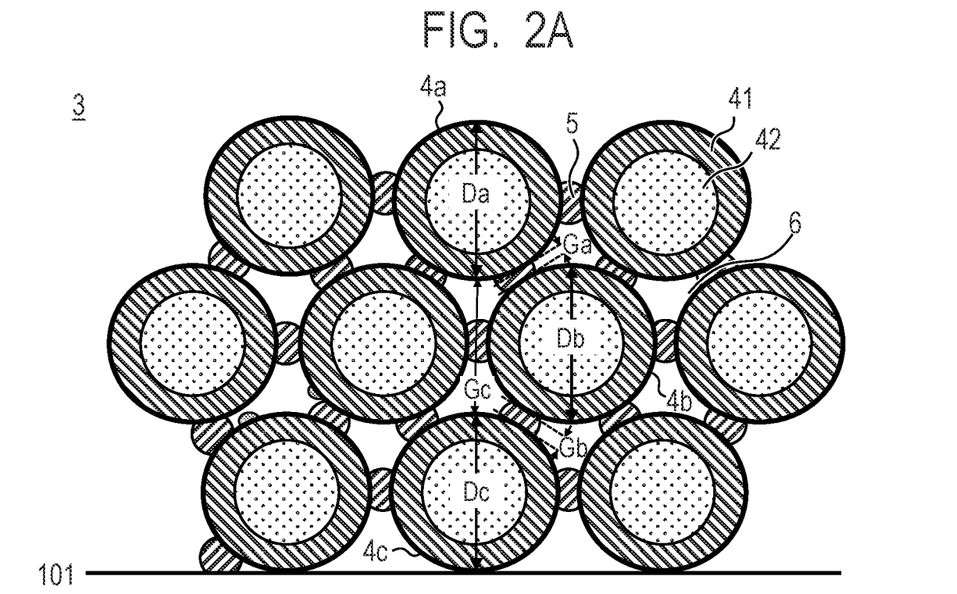
FIG. 2A and FIG. 2B are each a schematic view for illustrating the example of the light transmitting member.

The first porous layer 3 illustrated in FIG. 1B contains the plurality of hollow particles 4 bound to each other with a binding material 5. The number of pores in the first porous layer 3 correlates with the number of the hollow particles 4. The first porous layer 3 has several features. FIG. 2A is an enlarged view for illustrating an example of the first porous layer 3. As illustrated in FIG. 2A, the plurality of (10 in this case) hollow particles 4 are illustrated, but of the plurality of hollow particles 4, focus is given on a hollow particle 4a, a hollow particle 4b, and a hollow particle 4c. Here, the three particles 4a, 4b, and 4c are described, but the same applies also to the other hollow particles 4.

The hollow particle 4a has a size Da. The hollow particle 4b has a size db. The hollow particle 4c has a size Dc. Here, the sizes Da, db, and Dc are the sizes in the thickness direction of the first porous layer 3. A distance Ga between the hollow particle 4a and the hollow particle 4b is smaller than the size Da of the hollow particle 4a. The distance Ga between the hollow particle 4a and the hollow particle 4b is smaller than the size db of the hollow particle 4b. In addition, an air gap 6 is formed between the hollow particle 4a and the hollow particle 4b. The particle 4a and the particle 4b may be in contact with each other, and in this case, the distance Ga is zero.

A distance Gb between the hollow particle 4b and the hollow particle 4c is smaller than the size db of the hollow particle 4b. The distance Gb between the hollow particle 4b and the hollow particle 4c is smaller than the size Dc of the hollow particle 4c. In addition, the air gap 6 is formed between the hollow particle 4b and the hollow particle 4c. The hollow particle 4b and the hollow particle 4c may be in contact with each other, and in this case, the distance Gb is zero.

Further, a distance Gc between the hollow particle 4a and the hollow particle 4c is smaller than the size Da of the hollow particle 4a. The distance Gc between the hollow particle 4a and the hollow particle 4c is smaller than the size Dc of the hollow particle 4c. In addition, the air gap 6 is formed between the hollow particle 4a and the hollow particle 4c. The hollow particle 4a and the hollow particle 4c may be in contact with each other, and in this case, the distance Gc is zero.

Thus, the plurality of hollow particles 4 in the first porous layer 3 have a configuration in which another hollow particle 4 is present in the immediate vicinity of a certain hollow particle 4, and the air gap 6 is present between two hollow particles that are present in the vicinity thereof.

The thickness Ta of the first porous layer 3 is larger than a sum of the size Da of the particle 4a and the size db of the particle 4b (Ta>Da+db). In this example, the three particles 4a, 4b, and 4c are stacked in the thickness direction of the first porous layer 3, but the centers of the respective particles are displaced. Because of this, the thickness Ta of the first porous layer 3 is smaller than a sum of the size Da of the particle 4a, the size db of the particle 4b, and the size Dc of the particle 4c (Ta<Da+db+Dc).

The size Da of the particle 4a, the size db of the particle 4b, and the size Dc of the particle 4c are each, for example, 1 nm or more, or for example, 10 nm or more. The size Da of the particle 4a, the size db of the particle 4b, and the size Dc of the particle 4c are each, for example, less than 1 μm, for example, less than 500 nm, for example, less than 300 nm, or for example, less than 100 nm. The size of the air gap between the particles 4 is decreased when the sizes of the particles 4 are smaller. When the air gap between the particles 4 is larger, the refractive index of the first porous layer 3 can be decreased. Meanwhile, the height difference on the surface of the first porous layer 3 is also decreased when the sizes of the particles 4 are smaller. When the height difference on the surface of the first porous layer 3 is small, the scattering of light on the surface of the first porous layer 3 can be suppressed.

The hollow particle 4a and the hollow particle 4b are bound to each other with the binding material 5. In addition, the hollow particle 4b and the hollow particle 4c are bound to each other with the binding material 5.

Each of the hollow particle 4a, the hollow particle 4b, and the hollow particle 4c may contain an inorganic material. The inorganic material contained in each of the hollow particle 4a, the hollow particle 4b, and the hollow particle 4c may be a material containing silicon and oxygen. The silicon and the oxygen may form a siloxane bond. The inorganic material contained in each of the hollow particle 4a, the hollow particle 4b, and the hollow particle 4c may be silica. Each of the hollow particle 4a, the hollow particle 4b, and the hollow particle 4c may be a hollow silica particle.

The binding material 5 may contain an inorganic material or an organic material, but the inorganic material is preferred in that the inorganic material does not reduce the hydrophilicity of the first porous layer 3. The inorganic material contained in the binding material 5 as an inorganic binder may be a material containing silicon and oxygen. The silicon and the oxygen may form a siloxane bond. The inorganic material contained in the binding material 5 may be a silicate. That is, two hollow particles each containing an inorganic material may be bound to each other with the binding material 5 containing an inorganic material. The content of the inorganic binder contained in the first porous layer 3 is preferably 1 mass % or more and 20 mass % or less, more preferably 5 mass % or more and 20 mass % or less, still more preferably 5 mass % or more and 15 mass % or less with respect to the inorganic particles. When the content of the inorganic binder is 1 mass % or more and 20 mass % or less with respect to the inorganic particles, the first porous layer 3 can have a high antireflection effect while having sufficient strength.

Examples of an organic binder include known binders, such as an acrylic resin and an epoxy-based resin. An organic material generally has hydrophobicity, and hence, when an organic binder is used, it is required to suppress the content of the organic binder to such a level that allows the first porous layer 3 to function as a hydrophilic film. Specifically, the content of the organic binder contained in the first porous layer 3 is preferably 0.1 mass % or more and 2 mass % or less, more preferably 0.1 mass % or more and 1 mass % or less, still more preferably 0.1 mass % or more and 0.5 mass % or less with respect to the inorganic particles.

The hollow particles 4 each have a shape in which the inside a solid shell 41 is a hollow portion 42. The shell 41 may contain the inorganic material such as silica as described above.

The average particle diameter of the hollow particles 4 is preferably 15 nm or more and 100 nm or less, more preferably 15 nm or more and 60 nm or less. When the average particle diameter of the hollow particles 4 is less than 15 nm, it is difficult to stably produce particles. It is not preferred that the average particle diameter of the hollow particles 4 be more than 100 nm because the size of each of the air gaps between the hollow particles 4 is increased, and hence large air gaps are liable to be generated, and in addition, the scattering by the hollow particles 4 occurs. The average particle diameter of the hollow particles 4 is an average Feret diameter. The average Feret diameter may be measured by image processing of images of the plurality of hollow particles observed with a transmission electron microscope. Commercially available image processing software such as Image-Pro Plus (manufactured by Media Cybernetics, Inc.) may be used as an image processing method. In a predetermined image area, contrast adjustment is appropriately performed as required. Then, the Feret diameter of each of the particles is measured by particle measurement, and an average value of the plurality of particles is calculated, thereby being capable of determining an average Feret diameter.

The air gaps 6 are formed between the hollow particles contained in the first porous layer 3, and the air gaps 6 are connected to each other. Because of the presence of the hollow portions 42 of the hollow particles 4 and the air gaps 6, the refractive index of the first porous layer 3 can be decreased, and hence a high antireflection effect can be obtained. The pore volume of the first porous layer 3 is preferably 0.06 $cm^3/g$ or more and 0.27 $cm^3/g$ or less. When the pore volume is less than 0.06 $cm^3/g$, most of the air gaps 6 between the hollow particles 4 are lost, and the hardness of the first porous layer 3 becomes too high, with the result that cracks are liable to occur due to thermal shock. In addition, when the pore volume is more than 0.27 $cm^3/g$, the durability is decreased due to the shortage of the binding material. The volume of the air gaps 6 contained in the first porous layer 3 may be determined by a nitrogen gas adsorption method.

The nitrogen gas adsorption method is a method involving adsorbing nitrogen gas molecules from the surface of the porous layer to the inside of each of the air gaps 6 and measuring the pore volume from the condensation of the nitrogen gas molecules. Accordingly, the pore volume obtained by the nitrogen gas adsorption method is a volume of the air gaps that communicate to outside air, and does not include the volume of the hollow portions 42.

In FIG. 1B, there is illustrated the first porous layer 3 containing the hollow particles 4, but the particles contained in the first porous layer 3 are not limited to the hollow particles. As long as the above-mentioned physical thickness, refractive index, and pore volume are satisfied, the shape of each of the particles is not limited, and the particles contained in the first porous layer 3 may include porous particles, solid particles, and the like.

(With Regard to Second Porous Layer 7)

The second porous layer 7 contains the plurality of solid particles 8 bound to each other with a binding material 9.

The second porous layer 7 has a thickness of preferably 80 nm or more and 400 nm or less, more preferably 100 nm or more and 350 nm or less. There is a tendency that when the thickness is less than 80 nm, abrasion resistance is difficult to obtain, and when the thickness is more than 400 nm, cracks are liable to occur.

A refractive index $n_2$ of the second porous layer 7 is preferably 1.20 or more and 1.30 or less, more preferably 1.22 or more and 1.30 or less. In addition, the difference between the refractive index $n_2$ of the second porous layer 7 and the refractive index $n_1$ of the first porous layer 3 is preferably 0.1 or less for the reason described below. When light enters from the first porous layer 3 side, the reflected light at an interface between the first porous layer 3 and the base material 2 and the reflected light at an interface between the base material 2 and the second porous layer 7 cancel out each other to easily achieve a low reflectance.

Figure 2B:
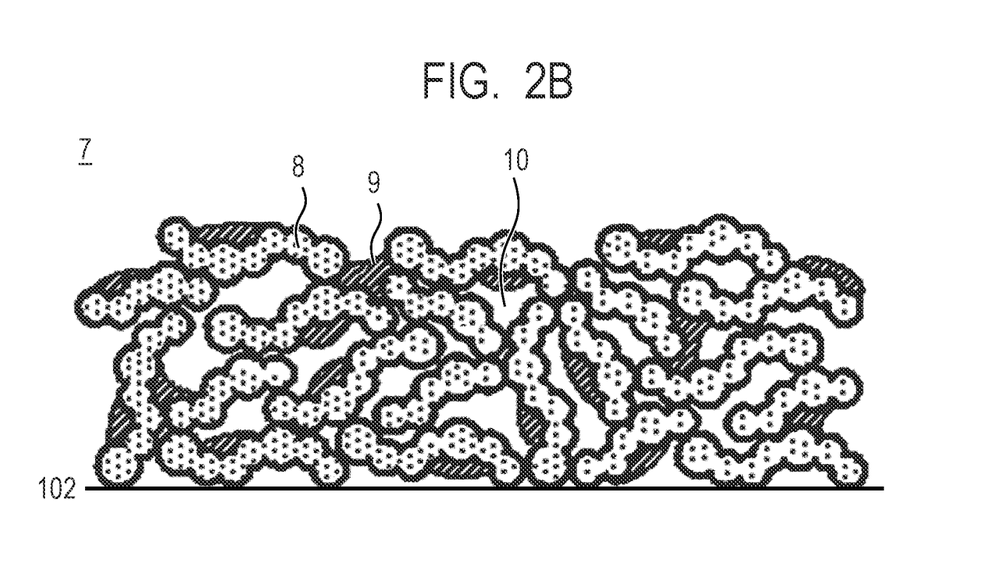

FIG. 2B is an enlarged view for illustrating an example of the second porous layer 7. The second porous layer 7 contains the plurality of solid particles 8 bound to each other with the binding material 9. Air gaps 10 formed between the solid particles 8 are connected to each other to communicate to outside air.

The average pore diameter of the air gaps 10 is preferably 3 nm or more and 50 nm or less in terms of values obtained by pore distribution measurement based on the nitrogen gas adsorption method. When the average pore diameter is 3 nm or more, air and water can move smoothly between the second porous layer 7 and the outside air, and sufficient antifogging performance can be obtained. When the average pore diameter is 50 nm or less, the number of air gaps each having a pore diameter of more than 100 nm, which cause the scattering of light, is small, and hence a high light transmitting property can be maintained. A more preferred pore diameter is 5 nm or more and 20 nm or less. The amount of the air gaps 10 contained in the second porous layer 7 may be determined as a pore volume by the nitrogen gas adsorption method in the same manner as in the first porous layer 3. It is preferred that the pore volume of the second porous layer 7 be larger than the pore volume of the first porous layer 3 and be 0.1 cm$^3$/g or more and 1.0 cm$^3$/g or less. When the pore volume is 0.1 cm$^3$/g or more, the amount of water sufficient for the second porous layer 7 to exhibit an antifogging property can be ensured. When the pore volume is 1.0 cm$^3$/g or less, sufficient strength can be obtained without decreasing the hardness of a skeleton. A more preferred pore volume is 0.34 cm$^3$/g or more and 0.55 cm$^3$/g or less.

The particles 8 may be solid particles. The particles 8 that are solid particles may be formed of a uniform solid material. Alternatively, the particles 8 that are solid particles may be formed so as to have a core-shell structure in which a solid core is wrapped with a solid shell.

As the second porous layer 7, any of an inorganic porous layer or an organic porous layer may be used as long as the layer can adsorb and retain water. However, it is preferred that the second porous layer 7 be an inorganic porous layer formed of solid particles made of an inorganic material because of the high strength of a film and the absence of swelling of the film at the time of absorption of water. Examples of the inorganic material include silicon oxide, zirconium oxide, and titanium oxide.

The solid particles have an average particle diameter of preferably 10 nm or more and 80 nm or less, more preferably 12 nm or more and 60 nm or less. When the average particle diameter of the solid particles is less than 10 nm, both the air gaps between the particles and the air gaps inside the particles become too small, and hence it is difficult to reduce the refractive index. In addition, it is not preferred that the average particle diameter be more than 80 nm because the size of each of the air gaps between the particles is increased, and hence large air gaps are liable to be generated, and in addition, the scattering in association with the size of each of the particles occurs.

The solid particles may have any of a true circular shape, an elliptical shape, a disc shape, a rod shape, a needle shape, a chain shape, or a square shape, and two or more kinds of particles may be used as a mixture thereof. The average particle diameter of the solid particles may be determined by the same method as that of the hollow particles described above as an average value of short diameters in the case of particles each having a short diameter and a long diameter and as an average Feret diameter in the case of particles each having a true circular shape.

In the example illustrated in FIG. 2B, the particles 8 may be chain-shaped particles. That is, the particles 8 that are chain-shaped particles each have a shape in which a plurality of solid particles are connected to each other in a linear manner or in a bent or branched manner. The air gaps 10 formed between two chain-shaped particles are connected to each other. The chain-shaped particles maintain the chain-shaped connection even when the chain-shaped particles form a film, and hence an air gap ratio can be increased as compared to the case of using other single particles. The number of particles connected in one chain-shaped particle is 2 or more and 10 or less, preferably 3 or more and 6 or less. When the number of connected particles is more than 10, large air gaps are liable to be generated, resulting in a decrease in abrasion resistance.

The solid particles are particles containing $SiO_2$, and Si accounts for preferably 80 atomic % or more, more preferably 90 atomic % or more in elements excluding oxygen. When Si accounts for less than 80 atomic %, the number of silanol (Si—OH) groups on particle surfaces is reduced, resulting in a tendency that the water adsorption amount decreases.

In the solid particles, in addition to $SiO_2$, metal oxides, such as $Al_2O_3$, $TiO_2$, $ZnO_2$, and $ZrO_2$, and organic components, such as alkyl groups and fluoroalkyl groups, via Si atoms may be introduced into the silicon oxide particles or the particle surfaces. It is more preferred to use hydrophilic particles in which silanol (Si—OH) groups remain on particle surfaces in consideration of the maintenance of the water absorbing property and low refractive index of the second porous layer 7. The silanol groups on the particle surfaces increase the interaction and reactivity between the particles or between the particles and the binding material, and a second porous layer having high mechanical strength can be obtained. Further, the interaction between the second porous layer and the polymer having an amphoteric hydrophilic group is also increased, and hence the polymer can be made difficult to peel off from the porous layer. In the present disclosure, the hydrophilicity of the solid particles in the second porous layer 7 is kept, and hence the film strength is not decreased.

The light transmitting member 1 is required to have a high light transmittance. The visible light transmittance of the light transmitting member 1 is preferably 90.0% or more, more preferably 95.0% or more. Specifically, the average transmittance in a wavelength range of 400 nm or more and 700 nm or less of the light transmitting member 1 is preferably 90.0% or more, more preferably 95.0% or more. Further, the transmittance at all the wavelengths in a wavelength range of 400 nm or more and 700 nm or less is also preferably 90.0% or more, more preferably 95.0% or more.

Relationship in Optical Characteristics Between First Porous Layer 3 and Second Porous Layer 7, and Light Transmitting Member 1

Figure 3A:
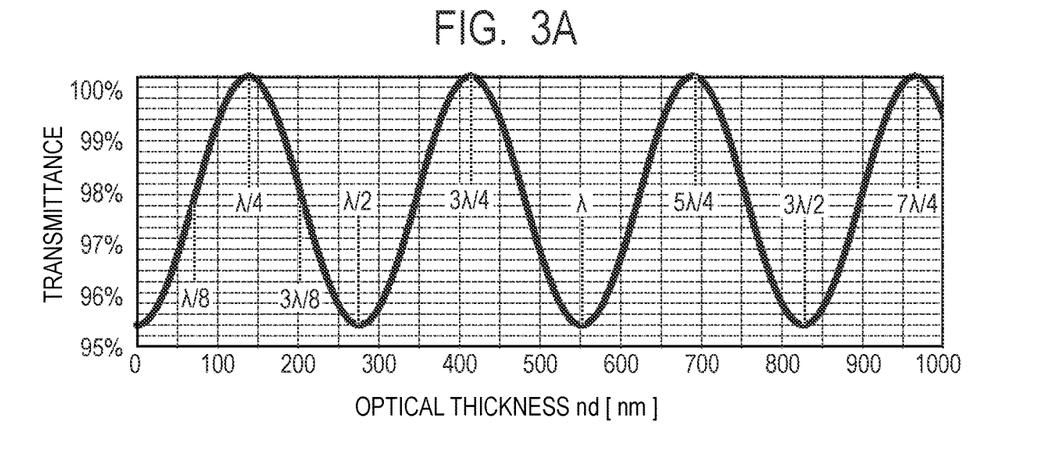
FIG. 3A, FIG. 3B, and FIG. 3C are each a graph for schematically showing a transmittance of the light transmitting member.

In FIG. 3A, there is shown an example of a schematic relationship between the optical thickness nd of the first porous layer 3 or the second porous layer 7, and the transmittance of the light transmitting member 1 with respect to light having a wavelength $\lambda$. The transmittance in the case where the optical thickness nd is an even multiple of $\lambda/4$ (nd=$\lambda/2$, $\lambda$, $3\lambda/2$) may be the same as that in the case where the first porous layer 3 and the second porous layer 7 are not formed (nd=0). When the optical thickness nd is an odd multiple of $\lambda/4$ (nd=$\lambda/4$, $3\lambda/4$, $5\lambda/4$, $7\lambda/4$), the transmittance with respect to light having a wavelength $\lambda$ can be increased to the extent possible. However, in a model shown in FIG. 3A, the absorption and scattering of light in the first porous layer 3 are not taken into consideration. In actuality, when the first porous layer 3 and the second porous layer 7 are thicker, the absorption and scattering of light in the first porous layer 3 and the second porous layer 7 of the light transmitting member 1 are increased, which may cause a decrease in transmittance.

Accordingly, it is preferred that the thickness of each of the first porous layer 3 and the second porous layer 7 be small. When the wavelength of light to be measured for transmittance is represented by $\lambda$, the optical thickness nd of the first porous layer 3 is preferably less than a half of the wavelength $\lambda$(nd<$\lambda/2$). When the optical thickness nd is less than $\lambda/2$, the transmittance can be increased by forming the first porous layer 3. In particular, the optical thickness nd of the first porous layer 3 is preferably $\lambda/8$ or more and $3\lambda/8$ or less of the wavelength $\lambda$.

Next, the wavelength $\lambda$ is described. The wavelength $\lambda$ is preferably 464 nm or more and 653 nm or less. This is because the standard visual sensitivity in photopic vision with respect to light at 464 nm or more and 653 nm or less is 0.1 or more. When the transmittance to light having a wavelength at which the standard visual sensitivity in photonic vision is 0.1 or more is increased, the recognition of reflected light by a human can be suppressed. The wavelength $\lambda$ is more preferably 509 nm or more and 614 nm or less. This is because the standard visual sensitivity in photopic vision with respect to light at 509 nm or more and 614 nm or less is 0.5 or more. When the transmittance to light having a wavelength at which the standard visual sensitivity in photonic vision is 0.5 or more is increased, the recognition of reflected light by a human can be more effectively suppressed. In the example of FIG. 3A, the wavelength $\lambda$ is set to 555 nm. This is because the wavelength $\lambda$ at which the standard visual sensitivity is a highest value of 1.0 is 555 nm.

Figure 3B:
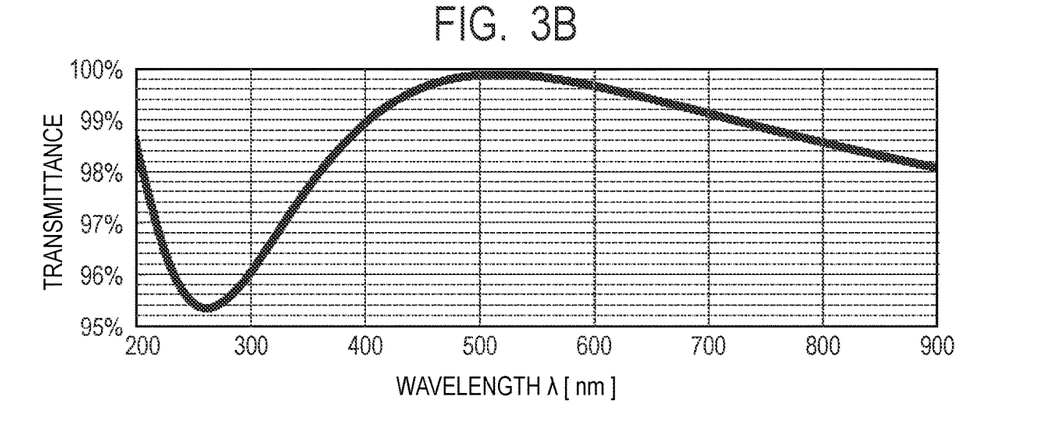

In FIG. 3B, there is shown an example of a schematic relationship in transmittance of the light transmitting member 1 with respect to light having various wavelengths. The example of FIG. 3B corresponds to the case in which the refractive index of each of the first porous layer 3 and the second porous layer 7 is set to 1.22 (square root of the refractive index of the base material 2), the physical thickness of each of the first porous layer 3 and the second porous layer 7 is set to 105 nm, and the optical thickness of each of the first porous layer 3 and the second porous layer 7 is set to 128 nm. In this case, the transmittance becomes highest with respect to light having a wavelength of 512 nm. That is, the foregoing is the same as the case in which the wavelength $\lambda$ is 512 nm. In the example of FIG. 3B, the transmittance at all the wavelengths in a wavelength range of 400 nm or more and 700 nm or less is 99.0% or more. Accordingly, the light transmitting member 1 with which it is difficult for a human to recognize reflected components of visible light can be obtained.

Figure 3C:
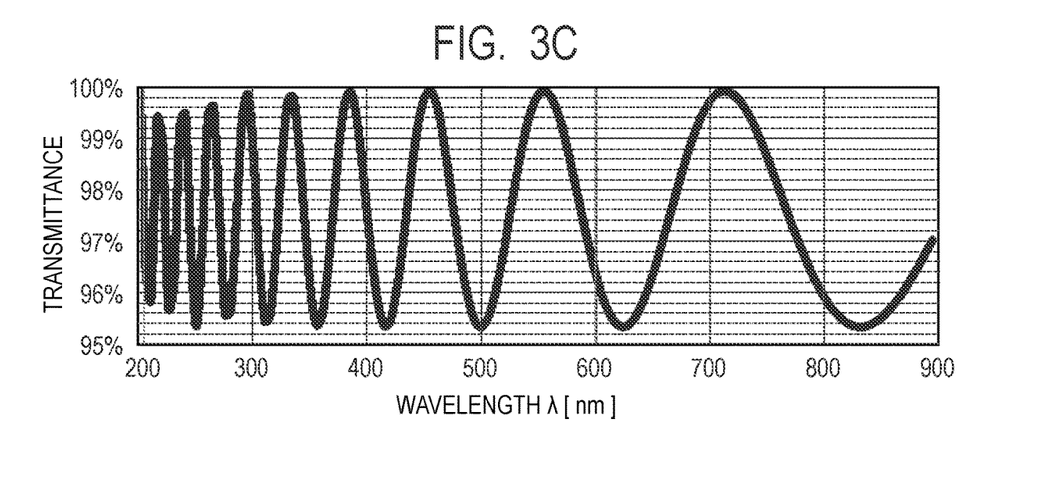

Also in FIG. 3C, there is shown an example of a schematic relationship in transmittance of the light transmitting member 1 with respect to light having various wavelengths. The example of FIG. 3C corresponds to the case in which the refractive index of each of the first porous layer 3 and the second porous layer 7 is set to 1.22 (square root of the refractive index of the base material 2), the physical thickness of each of the first porous layer 3 and the second porous layer 7 is set to 1,023 nm, and the optical thickness of each of the first porous layer 3 and the second porous layer 7 is set to 1,248 nm. In this case, the transmittance becomes highest with respect to light having a wavelength of 555 nm. That is, the foregoing means that the wavelength $\lambda$ is 555 nm, and the optical thickness nd is $9\lambda/4$. As is understood from FIG. 3C, there is a large variation in transmittance depending on the wavelength in a wavelength range of 400 nm or more and 700 nm or less, and the average transmittance does not exceed 99.0% as shown in FIG. 3B. It is also understood from the comparison between FIG. 3B and FIG. 3C that the optical thickness nd of the first porous layer 3 is preferably less than a half of the wavelength $\lambda$. (nd<$\lambda/2$).

The refractive index of each of the first porous layer 3 and the second porous layer 7 is preferably lower than the refractive index of the base material 2.

Assuming that each medium on the first porous layer 3 and the second porous layer 7 is air having a refractive index of 1.0, the first porous layer 3 and the second porous layer 7 may each function as an antireflection film that suppresses the reflection of light between the medium and the base material 2.

When the refractive index of each of the first porous layer 3 and the second porous layer 7 is closer to the square root of the refractive index of the base material 2, the antireflection effect is improved. The typical refractive index of the base material 2 including the resin base material 12 or the glass base material 11 is from 1.45 to 1.65. Accordingly, the refractive index of each of the first porous layer 3 and the second porous layer 7 is preferably 1.20 or more and 1.30 or less, more preferably 1.22 or more and 1.30 or less. When the ratio of the air gaps contained in each of the first porous layer 3 and the second porous layer 7 is large, the refractive index may become less than 1.20. However, when the ratio of the air gaps 6 contained in the layer is large, the abrasion resistance may become insufficient. When the refractive index is more than 1.30, the antireflection effect between the medium (air) and the base material 2 may not be sufficiently obtained.

The contact angle for water on the surface of each of the first porous layer 3 and the second porous layer 7 in the light transmitting member 1 is preferably less than 90°. When the contact angle for water is less than 90°, the surface becomes hydrophilic, and water droplets adhering to the front surface 110 or the back surface 120 can be made difficult to visually recognize. In addition, fogging caused by minute water droplets can also be suppressed, and an antifogging effect can be provided. In order to achieve such function, the contact angle for water on the surface of each of the first porous layer 3 and the second porous layer 7 is preferably 60° or less, more preferably 45° or less, still more preferably 30° or less. When the binding between the particles contained in the porous layer is weak, and the abrasion resistance of the porous layer is not sufficient, the number of the silanol (Si—OH) groups on the particle surfaces is small, and hence the contact angle for water is liable to exceed 45°. Specifically, the contact angle may be defined as a contact angle for pure water at a room temperature of 23° C. and a humidity of from 40% RH to 45% RH. The contact angle for water is preferably 3° or more, more preferably 5° or more. When the contact angle for water is less than 3°, water and the like are liable to permeate the first porous layer 3 and the second porous layer 7 regardless of humidity, and hence environmental stability may be decreased.

(With Regard to Resin Base Material 12)

The resin base material 12 of the base material 2 of the light transmitting member 1 is not particularly limited as long as the resin base material 12 is excellent in processability and has transparency in ensuring visibility. Specific examples of a resin for forming the resin base material 12 include: a polyester resin, such as polyethylene terephthalate (PET) or polybutylene terephthalate (PBT), a polycarbonate (PC) resin, a cellulose triacetate (TAC) resin, a cycloolefin (COP) resin, a polymethyl methacrylate (PMMA) resin, and an acrylic polyvinyl alcohol (PVA) resin. Of those, an amorphous resin excellent in transparency and adhesive property may be adopted as a resin for forming the resin base material 12 of the base material 2. However, the first porous layer 3 and the second porous layer 7 of this embodiment can achieve sufficient functionalities even when the base material 2 is a crystalline resin from the viewpoint of being able to improve a transmittance and follow the flexibility of the base material 2. The crystalline resin is excellent in chemical resistance as compared to the amorphous resin, and hence restrictions are less liable to occur also on the formation of the first porous layer 3 and the second porous layer 7. The crystalline resin is mainly polyethylene (PE), polypropylene (PP), polyamide (PA), polyacetal or polyoxymethylene (POM), polyethylene terephthalate (PET), polybutylene terephthalate (PBT), polyphenylene sulfide (PPS), polyether ether ketone (PEEK), a liquid crystal polymer (LCP), or polytetrafluoroethylene (PTFE). The polycarbonate (PC) resin and the polymethyl methacrylate (PMMA) resin are amorphous resins. The polyester resin is suitable for the resin base material 12, and polyethylene terephthalate (PET) is particularly preferred.

In addition, the resin base material 12 that does not contain particles in a raw material is more preferred. Because of the design in which particles are not contained in the raw material, scattering by the raw material particles in the resin base material 12 can be reduced, and the base material 2 having a high light transmitting property and being excellent in visibility can be provided.

In addition, inorganic glass containing, for example, zirconium oxide, titanium oxide, tantalum oxide, niobium oxide, hafnium oxide, lanthanum oxide, gadolinium oxide, silicon oxide, calcium oxide, barium oxide, sodium oxide, potassium oxide, boron oxide, or aluminum oxide may be used as the glass base material 11. A glass base material formed by grinding and polishing, molding, float molding, or the like may be used as the glass base material.

In order to improve the adhesiveness, strength, flatness, and the like of the base material 2 and to impart functions, such as antireflection and an antiglare property, to the base material 2, the surface of the base material may be washed or polished, or an adhesive layer, a hard coat layer, a refractive index control layer, and the like may be formed as the intermediate layer 13 between each of the first porous layer 3 and the second porous layer 7, and the glass base material 11 or the resin base material 12 of the base material 2. The intermediate layer 13 has a function to prevent the diffusion of impurities from the base material and enhance the antireflection performance of the porous layer. Suitable examples of the intermediate layer 13 include: a high-refractive-index layer containing zirconium oxide, titanium oxide, tantalum oxide, niobium oxide, or hafnium oxide; a low-refractive-index layer containing silicon oxide or magnesium fluoride; aluminum oxide; and a polymer. The intermediate layer 13 may be a single layer made of the above-mentioned materials or may be a laminate of a plurality of kinds of layers, but is preferably a layer in which a high-refractive-index layer having a relatively high refractive index and a low-refractive-index layer having a relatively low refractive index are alternately laminated. A layer having a refractive index of 1.4 or more is preferred for the high-refractive-index layer, and a layer having a refractive index of less than 1.4 is preferred for the low-refractive-index layer.

Together with the intermediate layer 13, a hydrophilic layer may be formed on the surface of the first porous layer 3 and/or the second porous layer 7 to the extent that a reflectance and transparency are not lost. For example, a hydrophilic polymer layer containing a perhydropolysilazane solution or a hydrophilic group is preferred. Specifically, a layer containing a polymer having an amphoteric hydrophilic group, such as a sulfobetaine group, a carbobetaine group, or a phosphorylcholine group, may be formed on the first and/or second porous layer by coating, dipping, or the like. It is desired that the polymer having an amphoteric hydrophilic group have silanol groups in molecules. The silanol groups contained in the polymer have a strong interaction, such as a hydrogen bond or a covalent bond, with the silanol groups of silicon oxide particles, and hence the hydrophilic polymer layer can be made difficult to remove from the surface of the first and/or second porous layer. When the hydrophilic polymer layer is formed on the surface, oil and fat components are less liable to permeate the first porous layer 3 and/or the second porous layer 7 and remain on the surface of the layer. For this reason, when water is brought into contact with the surface, water permeates the interface between the hydrophilic polymer and the oil and fat components. As a result, the oil and fat components rise to the surface and can be easily washed away under running water. From this viewpoint, it is preferred that a polymer layer having an amphoteric hydrophilic group be formed on the surface of the first porous layer 3 which is exposed to the external environment when the light transmitting member is used as a transparent protective cover for a window in a closed space, and thus decreases in water contact angle of the porous layer and refractive index of the film caused by the adhesion of an organic substance can be suppressed.

[Method of Producing Light Transmitting Member]

A method of producing the light transmitting member 1 includes: applying a coating liquid for forming the first porous layer 3 onto the base material 2 to form a coating film; drying and/or calcining the base material 2 having the coating film formed thereon to form the first porous layer 3: then applying a coating liquid for forming the second porous layer 7 onto a back surface of the base material 2 having the first porous layer 3 formed thereon to form a coating film; and drying and/or calcining the base material 2 having the coating film formed thereon to form the second porous layer 7.

Examples of a method of applying the coating liquid include gravure coating, die coating, spin coating, blade coating, roll coating, slit coating, printing, and dip coating. In particular, when a light transmitting member having a three-dimensionally complicated shape with a convex surface or a concave surface, such as a dome shape or a spherical shape, and including a thin film is produced, a spray method, spin coating, or the like may be used. In addition, in the case of application of the coating liquid onto a large area of a thin base material, such as a film or a sheet, gravure coating is preferred from the viewpoint of uniformity of a thickness, and micro-gravure coating, which enables the formation of a thin film in the order of 100 nm, is more preferred. In particular, in the case of application of the coating liquid onto a roll-shaped long film, roll-to-roll micro-gravure coating is preferred.

In order to form the first porous layer 3, the coating liquid is applied onto the base material 2 and dried and/or cured. The drying and/or the curing is a process for removing the solvent and depositing the particles 4 while binding the particles 4 to each other without disturbing the alignment, to thereby form a porous layer. The temperature for the drying and/or the curing depends on the heat resistance temperature of the base material 2, but is preferably 20° C. or more and 200° C. or less. The time for the drying and/or the curing may be a period of time that does not influence the base material 2 and enables the organic solvent in the layer to be evaporated, and is preferably 10 minutes or more and 200 hours or less, more preferably 30 minutes or more and 24 hours or less.

In order to obtain a porous layer in which the particles 4 are highly aligned, the state in which the alignment of the particles 4 is satisfactory is preferred. The difference in alignment of the particles 4 varies mainly depending on the state of dispersion of the particles 4 in the coating liquid for forming the porous layer and the state of dispersion of the particles 4 at the time of formation of the coating film.

When the particles 4 in the coating liquid are sufficiently dispersed without being influenced by a dispersion medium or the binding material 5, the particles 4 are easily aligned. However, when the particles 4 are dispersed in an aggregated state due to the influences of the dispersion medium and the binding material 5, the alignment deteriorates.

In addition, the flow of the particles 4 caused by the volatilization and drying, and concentration of the solvent when the coating liquid is applied onto the base material 2 to form the coating film also greatly influences the alignment. Even in the case where the state of dispersion of the particles 4 in the coating liquid is satisfactory, when the particles 4 are aggregated at the time of drying for forming the coating film, the alignment of the particles 4 is disturbed, with the result that the gaps between the particles 4 become large when the coating film is formed, and the air gaps in the surface direction of the base material 2 become large. Accordingly, the scattering in the visible light becomes large. In addition, the coating film is formed under a state in which the particles 4 are displaced without being aligned and deposited, and hence the stress distribution of the coating film becomes non-uniform, and the strength of the film cannot be sufficiently kept.

Through use of the particles 4 having a surface treatment agent added thereto in the first porous layer 3, the coating film can be formed under a state in which the particles 4 are aligned and deposited without disturbing the alignment thereof.

The surface treatment agent contained in the first porous layer 3 may be determined by, for example, elemental analysis of the particles 4 and the first porous layer 3 or separation and quantitative analysis using ion-exclusion chromatography or the like. In addition, the aligned and deposited film exhibits a high antifouling property because air gaps of several tens of nanometers are formed, and hence no more dirt can permeate the film.

The particles 4 contained in the first porous layer 3 are preferably hollow particles each including a hollow portion inside a spherical shell as described above.

The hollow particles can each decrease the refractive index of the first porous layer 3 with a gas (refractive index: 1.0) contained in the hollow portion. Any of a single pore or a porous portion may be used in the hollow portion, and may be appropriately selected. As a method of producing the hollow particles, there are given, for example, methods described in Japanese Patent Application Laid-Open No. 2001-233611 and Japanese Patent Application Laid-Open No. 2008-139581. Because of the hollow particles, the refractive index of a layer formed so that the particles 4 aligned in a parallel direction to the surface of the base material 2 are stacked in a plurality of stages can be decreased.

In order to form the second porous layer 7, the coating liquid is applied onto the base material 2 on a surface opposite to the first porous layer 3 and dried and/or cured. The drying and/or the curing is a process for removing the solvent and depositing the particles 8 while binding the particles 8 to each other, to thereby form the second porous layer 7. The temperature for the drying and/or the curing depends on the heat resistance temperature of the base material 2, but is preferably 20° C. or more and 200° C. or less. The time for the drying and/or the curing may be a period of time that does not influence the base material 2 and enables the organic solvent in the layer to be evaporated, and is preferably 10 minutes or more and 200 hours or less, more preferably 30 minutes or more and 24 hours or less. In this case, the first porous layer has high hardness, and hence the second porous layer 7 is formed after the first porous layer is formed first. Thus, the porous layers can be easily formed on both surfaces without an appearance failure such as scratches.

An inorganic material such as a silicate is suitable for the binding material 9. When the particles 8 of an inorganic material (silica) are bound to each other with the binding material 9 such as an inorganic material (silicate) substantially without incorporating a resin that is an organic polymer, the second porous layer 7 having a low refractive index and high strength can be formed.

According to the above-mentioned production method, the light transmitting member 1 that is less influenced by reflection and glare and is excellent in visibility while maintaining a low refractive index can be produced. The first porous layer 3 having a low refractive index is achieved by uniformly applying a dispersion liquid of silica particles onto the light transmitting member 1. There is a feature in that the refractive index of the first porous layer itself is low because of the air gaps 6 in first porous layer 3 and air gaps inside the particles 4. In addition, when an inorganic binder is used for binding the particles 4 to each other, the refractive index can be further decreased as compared to the case of using an organic binder. When the organic binder is contained in a large amount in the first porous layer 3, the refractive index of the first porous layer 3 is increased, resulting in an increase in reflection and a decrease in hydrophilicity of the first porous layer 3. Accordingly, when the organic binder is used, it is required to reduce the addition amount of the organic binder.

As the second porous layer 7, any of an inorganic porous layer or an organic porous layer may be used as long as the porous layer has the air gaps 10 and can adsorb and retain water, but the inorganic porous layer is preferred because of the high strength of a film and the absence of swelling of the film at the time of absorption of water. Examples of the inorganic material include silicon oxide, zirconium oxide, and titanium oxide.

In addition, when the first porous layer 3 having a low refractive index is formed on one surface of the base material 2, and the second porous layer 7 having a low refractive index is formed on another surface thereof, the scattering from the principal surfaces 101 and 102 of the base material 2 can be canceled out.

When such light transmitting member 1 is used, the visibility may be improved over a wide range of a field of view.

When the light transmitting member 1 is installed as a window in a closed space, it is appropriate that the first porous layer 3, which has high hardness, is hydrophilic, and has a high antifouling property, be formed on a surface on an outer side of the closed space, and the second porous layer 7 having hygroscopicity be formed on a surface on an inner side of the closed space. Because of such installation, dirt and bubbles adhering to the outer surface can be effectively removed, and water droplets caused by dew condensation that occurs in the closed space can be prevented. Thus, a more excellent anti-reflection function and high transparency can be achieved, and a light transmitting member excellent in visibility can be provided.

Figure 4:
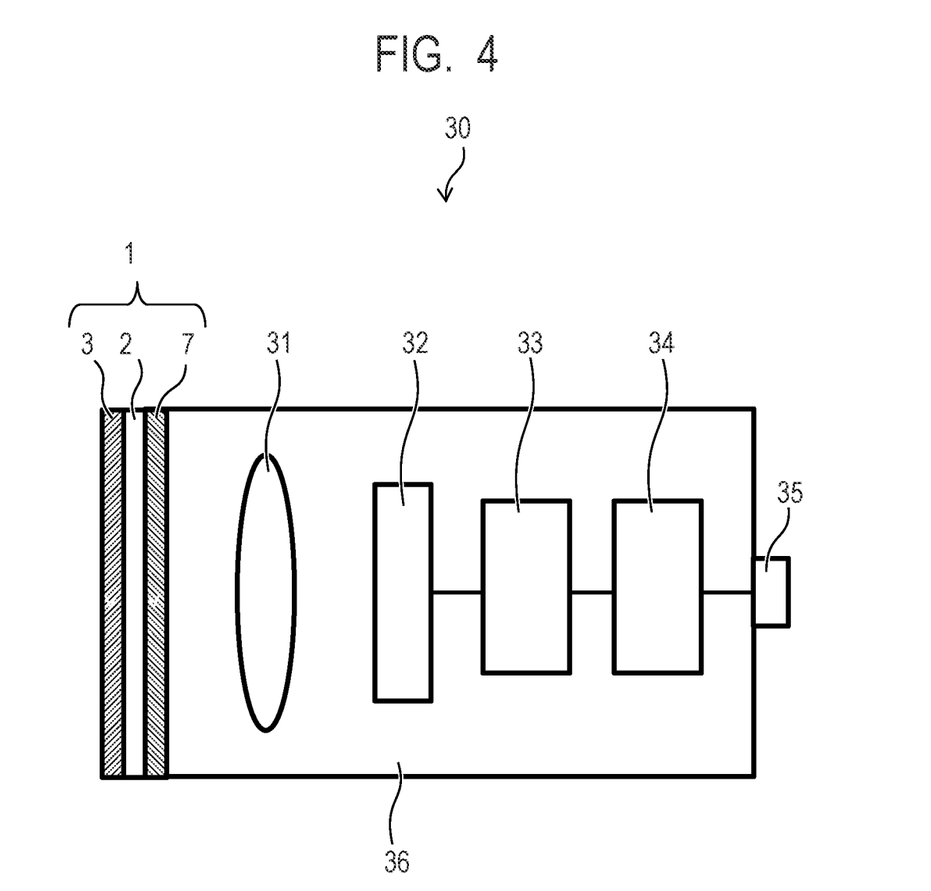
FIG. 4 is a view for illustrating a schematic configuration of an image pickup system that uses the light transmitting member according to the present disclosure as a window.

In FIG. 4, there is illustrated a configuration example of an image pickup system according to the present disclosure. An image pickup system 30 has a space surrounded by the light transmitting member 1 including the first porous layer 3, the base material 2, and the second porous layer 7, and a housing 36, and includes an optical system 31, an image sensor 32, a video engine 33, a compressed output circuit 34, and an output unit 35 in the space. In FIG. 4, the optical system 31, the image sensor 32, the video engine 33, the compressed output circuit 34, and the output unit 35 are illustrated as separate units, but an image pickup apparatus, such as a camera or a video, including those units may be used. Specific examples of the image pickup system include an underwater drone, an underwater camera, an agricultural camera, and a monitoring camera.

A video acquired through the light transmitting member 1 is guided by the optical system (lens) 31 to the image sensor 32, converted into a video analog signal (electric signal) by the image sensor 32, and is output. The video analog signal output from the image sensor 32 is converted into a video digital signal by the video engine 33, and the video digital signal output from the video engine 33 is compressed into a digital file by the compressed output circuit 34. In the process of converting the video analog signal into the video digital signal, the video engine 33 may perform processing of adjusting image quality, such as brightness adjustment, contrast adjustment, color correction, and noise removal. The signal output from the compressed output circuit 34 is output from the output unit 35 to external equipment through wiring.

The light transmitting member 1 is installed so that the surface on which the first porous layer 3 is formed is positioned on an outer side. Because of such configuration, prevention of dust from outside and protection against an impact are achieved, and water droplets adhering to the surface of the light transmitting member 1 due to a change in external environment are allowed to form a liquid film, thereby being capable of suppressing distortion of a video acquired by the image sensor 32. In addition, the surface on which the second porous layer 7 is formed is positioned on the closed space side, and hence water droplets caused by dew condensation that occurs in the closed space due to a change in environment can be adsorbed to the inside of each of the air gaps 6 to effectively prevent fogging. As a result, the light transmitting member 1 serving as the window at the time of capturing an image maintains an excellent antireflection function and a high light transmitting property regardless of a change in environment, and an image pickup system excellent in visibility can be provided.

Further, the image pickup system 30 may also be formed together with a pan-tilt unit that adjusts an angle of view, a controller that controls image pickup conditions and the like, a storage device that stores acquired video data, and a transfer unit that transfers the data output from the output unit 35 to outside, and the like.

EXAMPLES

Example 1

A light transmitting member was produced as described below.

Preparation of Coating Liquid for Forming First Porous Layer 3

A coating liquid for forming the first porous layer 3 was prepared by blending components having the following composition. While 1-ethoxy-2-propanol (hereinafter abbreviated as "1E2P") was added to 580 g of an isopropyl alcohol dispersion liquid of hollow silicon oxide particles (THRULYA 1110, manufactured by JGC Catalysts and Chemicals Ltd., average particle diameter: about 50 nm, shell thickness: about 10 nm, solid content concentration: 20.5 mass %), isopropyl alcohol was distilled off by heating. Isopropyl alcohol was distilled off until the solid content concentration became 19.5 mass %, to thereby prepare 610 g of a 1E2P solvent replacement liquid of hollow silicon oxide particles (hereinafter referred to as "solvent replacement liquid 1001"). A surface treatment agent was added to the obtained solvent replacement liquid 1001 so that the ratio of the hollow silicon oxide particles to the surface treatment agent (heptafluorobutyric acid, manufactured by Tokyo Chemical Industry Co., Ltd.) component became 100/1, to thereby provide a dispersion liquid 1002.

In another container, a solution of 1.7 g of nitric acid water (concentration: 3.7 mass %) diluted in advance and 2.30 g of ethanol was slowly added to a solution of 4.17 g of ethyl silicate and 2.30 g of ethanol. The mixture was stirred at room temperature for 15 hours, and then 2.00 g of the weighed reaction solution was diluted with 36.33 g of 2-ethyl-1-butanol to prepare a silica sol 1003 (solid content concentration: 0.6 mass %).

After the dispersion liquid 1002 was diluted with ethyl lactate so that the solid content concentration became 3.9 mass %, the silica sol 1003 was added to the resultant so that the ratio of the hollow silicon oxide particles to the silica sol component became 100/12. Further, the resultant was mixed and stirred at room temperature for 2 hours to provide a coating liquid 1005 containing hollow silicon oxide particles.

Preparation of Coating Liquid for Forming Second Porous Layer 7

A coating liquid for forming the second porous layer 7 was prepared by blending components having the following composition. 6.00 g of an IPA dispersion liquid of chain-shaped silicon oxide particles (IPA-ST-UP, manufactured by Nissan Chemical Industries, Ltd., average particle diameter: 12 nm, solid content concentration: 15 mass %) was diluted with 22.13 g of 1-ethoxy-2-propanol to prepare a chain-shaped silicon oxide particle dispersion liquid 1006 (solid content concentration: 3.20 mass %).

After the dispersion liquid 1006 was diluted with ethyl lactate so that the solid content concentration became 3.9 mass %, the silica sol 1003 was added to the resultant so that the ratio of the chain-shaped silicon oxide particles to the silica sol component became 100/12. Further, the resultant was mixed and stirred at room temperature for 2 hours to provide a coating liquid 1007 containing chain-shaped silicon oxide particles.

With Regard to Evaluation of Refractive Index

The refractive index of each of the first porous layer 3 and the second porous layer 7 was evaluated as described below. First, the first porous layer 3 and the second porous layer 7 were each formed on a polished surface side on a glass base material (φ30 mm, thickness: 1 mm, synthetic quartz having one side polished) and measured at a wavelength of from 380 nm to 800 nm through use of a spectroscopic ellipsometer (VASE, manufactured by J.A. Woollam Japan). The refractive index and thickness of each of the layers was obtained by analyzing the measurement results. The refractive index was defined as a refractive index at a wavelength of 550 nm. It was recognized that the first porous layer 3 and the second porous layer 7 used in this Example were each a film having a low refractive index of 1.25.

It was recognized that the first porous layer 3 and the second porous layer 7 used in this Example each had a thickness of about 110 nm.

With Regard to Measurement of Pore Volume

For measurement of a pore volume, a nitrogen adsorption isotherm was measured through use of an automatic vapor adsorption amount measuring device (BELSORP-MAX, manufactured by Bel Japan, Inc.), and the pore volume was determined by a BJH method.

Formation of First and Second Porous Layers on Base Material:

The first and second porous layers were formed on the base material as described below.

An appropriate amount of the coating liquid 1005 containing hollow particles made of silicon oxide was dropped onto a flat plate glass base material (S-BSL7, nd=1.52, manufactured by Ohara Inc.) having φ30 mm and a thickness of 1 mm and subjected to spin coating at 3,200 rpm for 20 seconds. After that, the resultant was calcined for 30 minutes in a circulating hot air oven at 140° C. to form the first porous layer 3. Next, an appropriate amount of the coating liquid 1007 containing chain-shaped particles made of silicon oxide was dropped onto a back surface of the base material having the first porous layer 3 formed thereon and subjected to spin coating at 3,500 rpm for 30 seconds. After that, the resultant was calcined for 30 minutes in the circulating hot air oven at 140° C. to form the second porous layer 7. Thus, a light transmitting member including the first porous layer 3 on one principal surface of the base material and the second porous layer 7 on another principal surface of the base material was produced.

The light transmitting member thus produced was evaluated as described below. The conditions of the light transmitting member of Example 1 are shown in Table 1, and the evaluation results thereof are shown in Table 2.

Camera for Evaluation:

The light transmitting member was installed in part of a housing made of plastic having a closed space therein so that the first porous layer 3 was positioned on an outer side and the second porous layer 7 was positioned on an inner side, and a camera for acquiring an image was installed in the housing. Thus, a camera for evaluation was produced, and evaluation was performed based on an image obtained therein.

Evaluation of Visibility at Time of Using Light Transmitting Member as Transparent Protective Cover (Evaluation 1):

The evaluation of visibility at the time of allowing the camera for evaluation to stand for 1 hour under an environment of 30° C. and a relative humidity of 95% and then allowing the camera for evaluation to stand for 1 minute under an environment of 10° C. was performed.

The evaluation of an image was performed from the viewpoint described below. That is, the presence or absence of deterioration of a camera image was evaluated as compared to the base material itself having no first and second porous layers formed thereon. The evaluation of an image was performed based on the following criteria.

A: An image is significantly improved as compared to a base material having no porous layers formed thereon.

B: An image is improved to a certain degree as compared to a base material having no porous layers formed thereon.

C: There is no significant difference in image as compared to a base material having no porous layers formed thereon.

In addition, in Table 2, there are shown states of the surfaces of the first porous layer 3 (outer surface) and the second porous layer 7 (inner surface) in Comparative Examples 1 to 4.

Evaluation of Visibility at Time of Using Light Transmitting Member as Transparent Protective Cover (Evaluation 2)

The evaluation of visibility after water was sprayed for 30 minutes under the simulation of the rainy weather at 22° C. was performed.

The evaluation was performed from the viewpoint described below. That is, the degree of transparency of the light transmitting member when viewed from an inner side (antifogging film) was evaluated based on an image as compared to the base material itself having no first and second porous layers formed thereon. The evaluation of visibility was performed based on the following criteria.

A: Visibility is significantly improved as compared to a base material having no porous layers formed thereon.

B: Visibility is improved to a certain degree as compared to a base material having no porous layers formed thereon.

C: There is no significant difference in visibility as compared to a base material having no porous layers formed thereon.

In addition, in Table 2, there are shown states of the surfaces of the first porous layer 3 (outer surface) and the second porous layer 7 (inner surface) in Comparative Examples 1 to 4.

In Examples 6 and 7, the evaluation of visibility when the immersion of the light transmitting member to a water depth of about 0.5 m for about 30 seconds was repeated 30 times was performed.

In Example 8, the evaluation was performed after the light transmitting member was exposed to the rain for 3 months as an agricultural rain cover film.

Evaluation of Wiping of Outer Surface of Light Transmitting Member:

The evaluation of wiping of an outer surface of the light transmitting member was performed as described below.

The evaluation was performed under the following two conditions: wiping with a polyester wiper (Alpha wiper TX1009, manufactured by Texwipe) soaked with pure water; and wiping with a dry polyester wiper. Under each of the conditions, a load of 300 g/cm² was applied, and the polyester wiper was reciprocated on the light transmitting member 10 times. After that, visual evaluation was performed regarding whether or not a failure occurred on the light transmitting member. The evaluation of wiping was performed based on the following criteria.

A: Satisfactory state in which no scratches and peeling are observed
B: State in which scratches are observed to a certain degree
C: State in which scratches are conspicuous and peeling is partly observed
D: State in which a film is peeled The conditions of the light transmitting member of Example 1 are shown in Table 1, and the evaluation results thereof are shown in Table 2.

Example 2

A light transmitting member was produced through use of the same base material as that of Example 1. The film formation on the base material was performed in the same manner as in Example 1, and the rotation number of spin coating was appropriately adjusted so that the thickness became 110 nm. The coating liquid 1005 for forming the first porous layer and the coating liquid 1007 for forming the second porous layer were produced as described below.

After the dispersion liquid 1002 was diluted with ethyl lactate so that the solid content concentration became 3.9 mass %, the silica sol 1003 was added to the resultant so that the ratio of the hollow particles of silicon oxide to the silica sol component became 100/22. Further, the resultant was mixed and stirred at room temperature for 2 hours to provide a coating liquid 1005 containing hollow particles of silicon oxide.

After the dispersion liquid 1006 was diluted with ethyl lactate so that the solid content concentration became 3.9 mass %, the silica sol 1003 was added to the resultant so that the ratio of the chain-shaped particles of silicon oxide to the silica sol component became 100/22. Further, the resultant was mixed and stirred at room temperature for 2 hours to provide a coating liquid 1007 containing chain-shaped particles of silicon oxide. The conditions of the light transmitting member of Example 2 are shown in Table 1, and the evaluation results thereof are shown in Table 2.

Example 3

A light transmitting member was produced through use of the same base material as that of Example 1. The film formation on the base material was performed in the same manner as in Example 1, and the rotation number of spin coating was appropriately adjusted so that the thickness became 110 nm. The coating liquid 1005 for forming the first porous layer and the coating liquid 1007 for forming the second porous layer were produced as described below.

After the dispersion liquid 1002 was diluted with ethyl lactate so that the solid content concentration became 3.9 mass %, the silica sol 1003 was added to the resultant so that the ratio of the hollow particles of silicon oxide to the silica sol component became 100/2. Further, the resultant was mixed and stirred at room temperature for 2 hours to provide a coating liquid 1005 containing hollow particles of silicon oxide.

After the dispersion liquid 1006 was diluted with ethyl lactate so that the solid content concentration became 3.9 mass %, the silica sol 1003 was added to the resultant so that the ratio of the chain-shaped particles of silicon oxide to the silica sol component became 100/2. Further, the resultant was mixed and stirred at room temperature for 2 hours to provide a coating liquid 1007 containing chain-shaped particles of silicon oxide. The conditions of the light transmitting member of Example 3 are shown in Table 1, and the evaluation results thereof are shown in Table 2.

Example 4

A light transmitting member was produced through use of the same coating liquid as that of Example 1. The film formation on the base material was performed as described below. An appropriate amount of the coating liquid 1005 containing hollow particles of silicon oxide was dropped onto a flat plate polycarbonate plate having φ30 mm and a thickness of 2 mm and subjected to spin coating at 3,200 rpm for 30 seconds. After that, the resultant was dried for 30 minutes in a circulating hot air oven at 60° C. to form the first porous layer 3. Next, an appropriate amount of the coating liquid 1007 containing chain-shaped particles of silicon oxide was dropped onto a back surface of the base material having the first porous layer 3 formed thereon and subjected to spin coating at 3,500 rpm for 30 seconds. After that, the resultant was dried for 30 minutes in the circulating hot air oven at 60° C. to form the second porous layer 7. The conditions of the light transmitting member of Example 4 are shown in Table 1, and the evaluation results thereof are shown in Table 2.

Example 5

A light transmitting member was produced through use of the same coating liquid as that of Example 1. The film formation was performed under the following conditions. A roll-shaped polyester film (PET film) (Lumirror #188-U34, manufactured by Toray Industries, Inc., surface treatment <inner surface> easy-adhesion coating, surface treatment <outer surface> easy-adhesion coating) having a width of 300 mm and a length of 200 M was used as a base material. In addition, the film formation was performed through use of a roll-to-roll coater (UVS-700, manufactured by Labo Co., Ltd.) as a film forming apparatus. A micro-gravure system was used as a coating system under the condition that the film forming speed was 2.5 M/min.

First, the coating liquid 1005 was prepared in an apparatus pan, and the ratio between the film forming speed and the rotation speed of a micro-gravure roll was adjusted so that the thickness became 110 nm. Under this condition, the first porous layer 3 was formed, and then the second porous layer 7 was formed also on a back surface of the base material having the first porous layer formed thereon under the same condition. The drying temperature after the film formation was set to 80° C. The conditions of the film of Example 5 are shown in Table 1, and the evaluation results thereof are shown in Table 2.

Example 6

A cover glass for an underwater camera was produced through use of the same coating liquid as that of Example 1.

A flat plate glass base material (S-BSL7, nd=1.52, manufactured by Ohara Inc.) having φ50 mm and a thickness of 2 mm was used as a base material. The film formation on the base material was performed by the same method as that of Example 1. The conditions of the light transmitting member of Example 6 are shown in Table 1, and the evaluation results thereof are shown in Table 2.

Example 7

A lens for swimming goggles was produced through use of the same coating liquid as that of Example 1. The film formation on the lens was performed by the same method as that of Example 1. A lens made of polycarbonate having an elliptical shape with a long axis of 50 mm and a short axis of 30 mm and having a thickness of 1 mm was used as a lens. The lenses were attached to commercially available glasses for swimming goggles and evaluated. The evaluation was performed by putting the lenses on a human body and causing the human body to go in and out of the water. The conditions of the lens of Example 7 are shown in Table 1, and the evaluation results thereof are shown in Table 2.

Example 8

The film produced in Example 5 was used as a rain cover film for growing tomatoes and evaluated. The conditions of the film of Example 8 are shown in Table 1, and the evaluation results thereof are shown in Table 2.

Example 9

A hemispherical dome-shaped transparent protective cover for a monitoring camera was produced through use of the same coating liquid as that of Example 1. The film formation on the hemispherical dome-shaped transparent protective cover was performed by the same method as that of Example 1. A cover made of polycarbonate having a maximum diameter of φ100 mm was used as the transparent protective cover. The conditions of the transparent protective cover of Example 9 are shown in Table 1, and the evaluation results thereof are shown in Table 2.

Comparative Example 1

A light transmitting member for comparison was produced as described below.

The same base material as that of Example 1 having no first porous layer and second porous layer formed thereon was used. The conditions of the light transmitting member of Comparative Example 1 are shown in Table 1, and the evaluation results thereof are shown in Table 2.

Comparative Example 2

A light transmitting member for comparison was produced as described below. The same base material as that of Example 4 having no first porous layer and second porous layer formed thereon was used. The conditions of the light transmitting member of Comparative Example 2 are shown in Table 1, and the evaluation results thereof are shown in Table 2.

Comparative Example 3

In this Comparative Example 3, a first porous layer containing chain-shaped particles and a second porous layer containing hollow particles were formed on both surfaces of a base material.

A light transmitting member was produced through use of the same base material as that of Example 1. The film formation on the base material was performed in the same manner as in Example 1, and the rotation number of spin coating was appropriately adjusted so that the thickness became 110 nm. The coating liquid 1005 for forming the first porous layer and the coating liquid 1007 for forming the second porous layer were produced as described below.

After the dispersion liquid 1006 was diluted with ethyl lactate so that the solid content concentration became 3.9 mass %, the silica sol 1003 was added to the resultant so that the ratio of the chain-shaped particles of silicon oxide to the silica sol component became 100/42. Further, the resultant was mixed and stirred at room temperature for 2 hours to provide a coating liquid 1005 containing chain-shaped particles of silicon oxide.

After the dispersion liquid 1002 was diluted with ethyl lactate so that the solid content concentration became 3.9 mass %, the silica sol 1003 was added to the resultant so that the ratio of the hollow particles of silicon oxide to the silica sol component became 100/2. Further, the resultant was mixed and stirred at room temperature for 2 hours to provide a coating liquid 1007 containing hollow particles of silicon oxide.

The conditions of the light transmitting member of Comparative Example 3 are shown in Table 1, and the evaluation results thereof are shown in Table 2.

Comparative Example 4

In this Comparative Example 4, a first porous layer containing chain-shaped particles and a second porous layer containing chain-shaped particles were formed on both surfaces of a base material.

A light transmitting member was produced through use of the same base material as that of Example 1. The film formation on the base material was performed in the same manner as in Example 1, and the rotation number of spin coating was appropriately adjusted so that the thickness became 110 nm. The coating liquid 1005 for forming the first porous layer and the coating liquid 1007 for forming the second porous layer were produced as described below.

After the dispersion liquid 1006 was diluted with ethyl lactate so that the solid content concentration became 3.9 mass %, the silica sol 1003 was added to the resultant so that the ratio of the chain-shaped particles of silicon oxide to the silica sol component became 100/12. Further, the resultant was mixed and stirred at room temperature for 2 hours to provide a coating liquid 1005 containing chain-shaped particles of silicon oxide.

The dispersion liquid 1006 was diluted with ethyl lactate so that the solid content concentration became 3.9 mass % to provide a coating liquid 1007. The conditions of the light transmitting member of Comparative Example 4 are shown in Table 1, and the evaluation results thereof are shown in Table 2.

TABLE 1

| | Base material | | | Film formation method | Use application | Test of antifogging film for outer side Particle |
|---|---|---|---|---|---|---|
| | Material | Thickness | Intermediate layer | | | |
| Example 1 | Glass | 1 mm | Absent | Spin coating | — | Hollow particle |
| Example 2 | Glass | 1 mm | Absent | Spin coating | — | Hollow particle |
| Example 3 | Glass | 1 mm | Absent | Spin coating | — | Hollow particle |
| Example 4 | Polycarbonate | 1 mm | Absent | Spin coating | — | Hollow particle |
| Example 5 | PET film | 250 μm | Absent | Micro-gravure | — | Hollow particle |
| Example 6 | Glass | 2 mm | Absent | Spin coating | Underwater camera | Hollow particle |
| Example 7 | Polycarbonate | 1 mm | Absent | Spin coating | Swimming goggles | Hollow particle |
| Example 8 | PET film | 250 μm | Absent | Micro-gravure | Agricultural film | Hollow particle |
| Example 9 | Polycarbonate | 1 mm | Absent | Spin coating | Monitoring camera | Hollow particle |
| Comparative Example 1 | Glass | 1 mm | Absent | Spin coating | Protective cover | — |
| Comparative Example 2 | Polycarbonate | 1 mm | Absent | Spin coating | Protective cover | — |
| Comparative Example 3 | Glass | 1 mm | Absent | Spin coating | Protective cover | Chain-shaped particle |
| Comparative Example 4 | Glass | 1 mm | Absent | Spin coating | Protective cover | Chain-shaped particle |

| | Test of antifogging film for outer side | | | Test of antifogging film for outer side | | | |
|---|---|---|---|---|---|---|---|
| | Pore volume cm³/g | Refractive index % | Thickness nm | Particle | Pore volume cm³/g | Refractive index % | Thickness nm |
| Example 1 | 0.17 | 1.25 | 110 | Chain-shaped particle | 0.45 | 1.25 | 110 |
| Example 2 | 0.06 | 1.3 | 110 | Chain-shaped particle | 0.34 | 1.3 | 110 |
| Example 3 | 0.27 | 1.2 | 110 | Chain-shaped particle | 0.55 | 1.2 | 110 |
| Example 4 | 0.17 | 1.25 | 110 | Chain-shaped particle | 0.45 | 1.25 | 110 |
| Example 5 | 0.17 | 1.25 | 110 | Chain-shaped particle | 0.45 | 1.25 | 110 |
| Example 6 | 0.17 | 1.25 | 110 | Chain-shaped particle | 0.45 | 1.25 | 110 |
| Example 7 | 0.17 | 1.25 | 110 | Chain-shaped particle | 0.45 | 1.25 | 110 |
| Example 8 | 0.17 | 1.25 | 110 | Chain-shaped particle | 0.45 | 1.25 | 110 |
| Example 9 | 0.17 | 1.25 | 110 | Chain-shaped particle | 0.45 | 1.25 | 110 |
| Comparative Example 1 | — | — | 110 | — | — | — | 110 |
| Comparative Example 2 | — | — | 110 | — | — | — | 110 |
| Comparative Example 3 | 0.11 | 1.4 | 110 | Hollow particle | 0.27 | 1.2 | 110 |
| Comparative Example 4 | 0.45 | 1.25 | 110 | Chain-shaped particle | 0.58 | 1.19 | 110 |

TABLE 2

| | Evaluation results of light transmitting member ||||||||
| | Evaluation of visibility (evaluation 1) ||| Evaluation of visibility (evaluation 2) ||| Evaluation of wiping of outer surface ||
| | Overall | Outer surface | Inner surface | Overall | Outer surface | Inner surface | Dry wiping | Pure water wiping |
|---|---|---|---|---|---|---|---|---|
| Example 1 | A | — | — | A | — | — | A | A |
| Example 2 | A | — | — | A | — | — | A | A |
| Example 3 | A | — | — | A | — | — | A | A |
| Example 4 | A | — | — | A | — | — | A | A |
| Example 5 | A | — | — | A | — | — | A | A |
| Example 6 | A | — | — | A | — | — | A | A |
| Example 7 | A | — | — | A | — | — | A | A |
| Example 8 | A | — | — | A | — | — | A | A |
| Example 9 | A | — | — | A | — | — | A | A |
| Comparative Example 1 | — | Adhesion of water droplet | Fogging | — | Adhesion of water droplet | Absent | A | A |
| Comparative Example 2 | — | Adhesion of water droplet | Fogging | — | Adhesion of water droplet | Absent | B | A |
| Comparative Example 3 | C | | Adhesion of water droplet | B | | Adhesion of water droplet | B | B |
| Comparative Example 4 | B | Water mark | | B | Water mark | | C | B |

From the results in Table 2, it was able to be recognized that the light transmitting members of Examples were able to achieve satisfactory functionalities as transparent protective covers for various applications.

According to the present disclosure, the technology that is advantageous for improving functionalities, such as hydrophilicity, an antifogging property, an antifouling property, and strength, of a light transmitting member can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-197361, filed Dec. 3, 2021, and Japanese Patent Application No. 2022-164910, filed Oct. 13, 2022, which are hereby incorporated by reference herein in their entirety.

What is claimed is:

1. A light transmitting member comprising:
a base material;
a first porous layer formed on a first surface of the base material; and
a second porous layer formed on a second surface opposed to the first surface of the base material,
wherein the second porous layer has a pore volume larger than a pore volume of the first porous layer.

2. The light transmitting member according to claim 1, wherein the pore volume of the first porous layer determined by a nitrogen gas adsorption method is 0.06 cm$^3$/g or more and 0.27 cm$^3$/g or less.

3. The light transmitting member according to claim 1, wherein the pore volume of the second porous layer determined by a nitrogen gas adsorption method is 0.1 cm$^3$/g or more and 1.0 cm$^3$/g or less.

4. The light transmitting member according to claim 1, wherein the first porous layer and the second porous layer each have a refractive index of 1.20 or more and 1.30 or less.

5. The light transmitting member according to claim 1, wherein the second porous layer contains a plurality of particles bound to each other with a binding material, wherein the plurality of particles have air gaps therebetween, and
wherein the air gaps are connected to each other to communicate to outside air.

6. The light transmitting member according to claim 5, wherein the plurality of particles have an average particle diameter of 10 nm or more and 80 nm or less.

7. The light transmitting member according to claim 5, wherein the plurality of particles are chain-shaped particles of silicon oxide.

8. The light transmitting member according to claim 7, wherein the binding material is an inorganic binder.

9. The light transmitting member according to claim 8, wherein the inorganic binder is a silicate.

10. The light transmitting member according to claim 1, wherein the first porous layer contains a plurality of hollow particles bound to each other with a binding material.

11. The light transmitting member according to claim 10, wherein the plurality of hollow particles each have a shell made of silicon oxide.

12. The light transmitting member according to claim 10, wherein the plurality of hollow particles have an average particle diameter of 15 nm or more and 100 nm or less.

13. The light transmitting member according to claim 11, wherein the binding material is an inorganic binder.

14. The light transmitting member according to claim 13, wherein the inorganic binder is a silicate.

15. The light transmitting member according to claim 1, wherein the first porous layer has a thickness of 80 nm or more and 200 nm or less, and
wherein the second porous layer has a thickness of 80 nm or more and 400 nm or less.

16. A structure including a closed space with a window, wherein the light-transmitting member of claim 1 as the window is set so that the second porous layer is positioned on a side of the closed space.

17. An image pickup system comprising:
a light transmitting member;
a housing;
an optical system; and
an image sensor,
the image pickup system having a space surrounded by the light transmitting member and the housing,
the optical system and the image sensor being arranged in the space,
wherein the light transmitting member includes a first porous layer on a surface in contact with an outside and a second porous layer on a surface in contact with an inside of the space, and
wherein the second porous layer has a pore volume larger than a pore volume of the first porous layer.

18. The image pickup system according to claim 17, wherein the pore volume of the first porous layer determined by a nitrogen gas adsorption method is 0.06 cm$^3$/g or more and 0.27 cm$^3$/g or less.

19. The image pickup system according to claim 17, wherein the pore volume of the second porous layer determined by a nitrogen gas adsorption method is 0.1 cm$^3$/g or more and 1.0 cm$^3$/g or less.

20. The image pickup system according to claim 17, wherein the first porous layer and the second porous layer each have a refractive index of 1.20 or more and 1.30 or less.

21. The image pickup system according to claim 17,
wherein the second porous layer contains a plurality of particles bound to each other with a binding material,
wherein the plurality of particles have air gaps therebetween, and
wherein the air gaps are connected to each other to communicate to outside air.

22. The image pickup system according to claim 17, wherein the plurality of particles have an average particle diameter of 10 nm or more and 80 nm or less.

23. The image pickup system according to claim 17, wherein the plurality of particles are chain-shaped particles of silicon oxide.

24. The image pickup system according to claim 23, wherein the binding material is an inorganic binder.

25. The image pickup system according to claim 24, wherein the inorganic binder is a silicate.

26. The image pickup system according to claim 17, wherein the first porous layer contains a plurality of hollow particles bound to each other with a binding material.

27. The image pickup system according to claim 26, wherein the plurality of hollow particles each have a shell made of silicon oxide.

28. The image pickup system according to claim 26, wherein the plurality of hollow particles have an average particle diameter of 15 nm or more and 100 nm or less.

29. The image pickup system according to claim 27, wherein the binding material is an inorganic binder.

30. The image pickup system according to claim 29, wherein the inorganic binder is a silicate.

31. The image pickup system according to claim 17,
wherein the first porous layer has a thickness of 80 nm or more and 200 nm or less, and
wherein the second porous layer has a thickness of 80 nm or more and 400 nm or less.

32. The image pickup system according to claim 17, wherein the image pickup system is any one selected from the group consisting of an underwater drone, an underwater camera, an agricultural camera, and a monitoring camera.

* * * * *